No. 753,257. PATENTED MAR. 1, 1904.
J. M. HANSEN.
TRIPLE HOPPER COKE CAR.
APPLICATION FILED AUG. 19, 1903.
NO MODEL. 5 SHEETS—SHEET 1.

Witnesses
Geo. B Rowley
J. R. Keller

Inventor
John M. Hansen
By Ray, Totten & Winter
Attorneys

No. 753,257. PATENTED MAR. 1, 1904.
J. M. HANSEN.
TRIPLE HOPPER COKE CAR.
APPLICATION FILED AUG. 19, 1903.
NO MODEL. 5 SHEETS—SHEET 2.

Witnesses
Geo. B Rowley
J. R. Keller

Inventor
John M. Hansen
By
Kay, Totten & Winter
Attorneys

No. 753,257. PATENTED MAR. 1, 1904.
J. M. HANSEN.
TRIPLE HOPPER COKE CAR.
APPLICATION FILED AUG. 19, 1903.
NO MODEL. 5 SHEETS—SHEET 3.

Witnesses
Geo. B. Rowley
J. R. Keller

Inventor
John M. Hansen,
By Kay, Totten & Winter
Attorneys

No. 753,257. PATENTED MAR. 1, 1904.
J. M. HANSEN.
TRIPLE HOPPER COKE CAR.
APPLICATION FILED AUG. 19, 1903.
NO MODEL. 5 SHEETS—SHEET 4.

Witnesses
Geo. B Rowley
J. R. Keller

Inventor
John M. Hansen,
By Kay, Totten &  Winter
Attorneys

No. 753,257. PATENTED MAR. 1, 1904.
J. M. HANSEN.
TRIPLE HOPPER COKE CAR.
APPLICATION FILED AUG. 19, 1903.
NO MODEL. 5 SHEETS—SHEET 5.
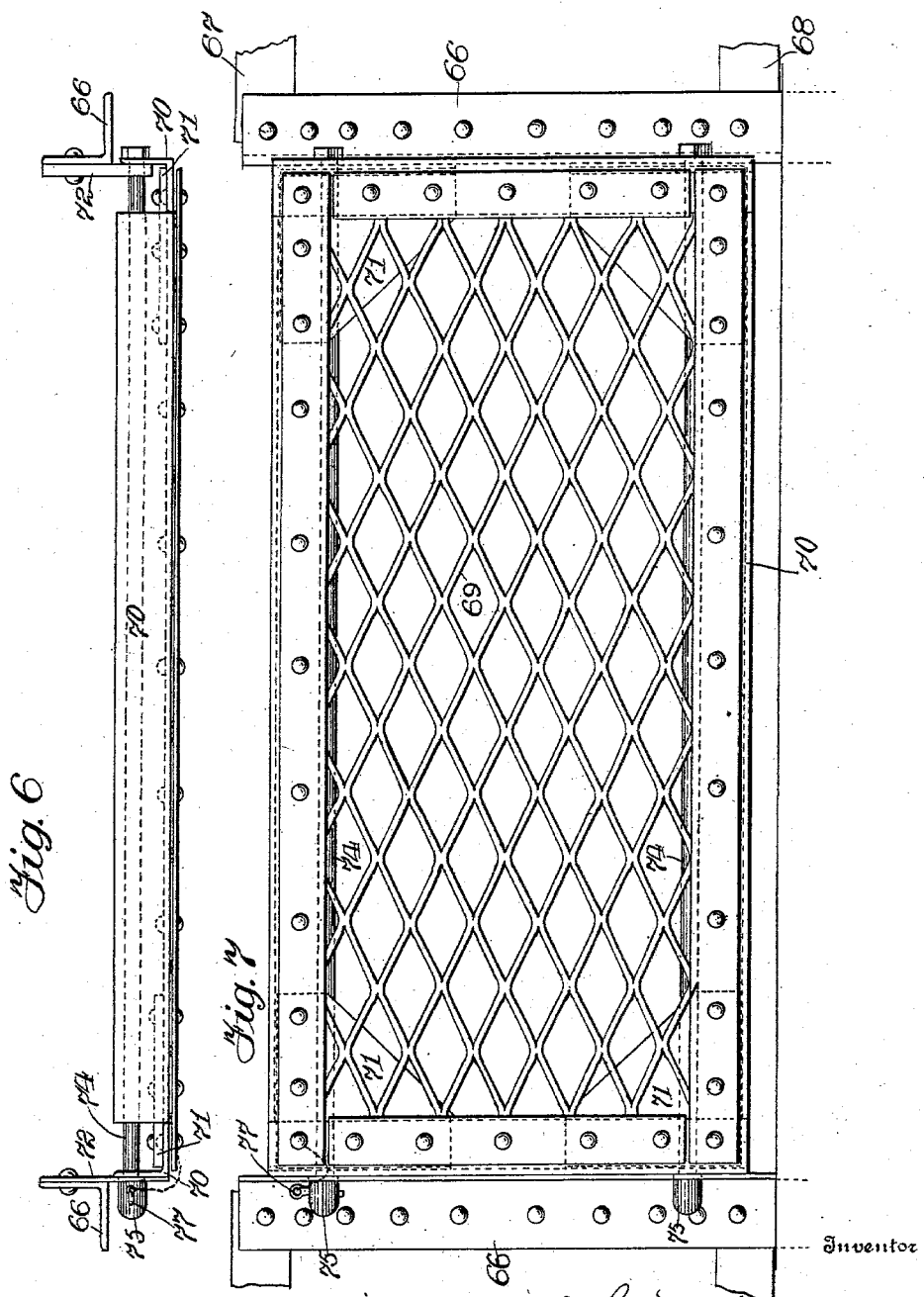
Witnesses
Geo. B Rowley
J. R. Keller
Inventor
John M. Hansen
By Kay, Totten & Winter
Attorneys No. 753,257. Patented March 1, 1904.

UNITED STATES PATENT OFFICE.

JOHN M. HANSEN, OF PITTSBURG, PENNSYLVANIA.

TRIPLE-HOPPER COKE-CAR.

SPECIFICATION forming part of Letters Patent No. 753,257, dated March 1, 1904.

Application filed August 19, 1903. Serial No. 170,007. (No model.)

*To all whom it may concern:*

Be it known that I, JOHN M. HANSEN, a resident of Pittsburg, in the county of Allegheny and State of Pennsylvania, have invented a new and useful Improvement in Triple-Hopper Coke-Cars; and I do hereby declare the following to be a full, clear, and exact description thereof.

My invention relates to railway-cars, and more especially to hopper-bottom cars for carrying coke and similar substances.

The object of my invention is to improve cars of this character in details of construction hereinafter described and claimed.

Figure 1:
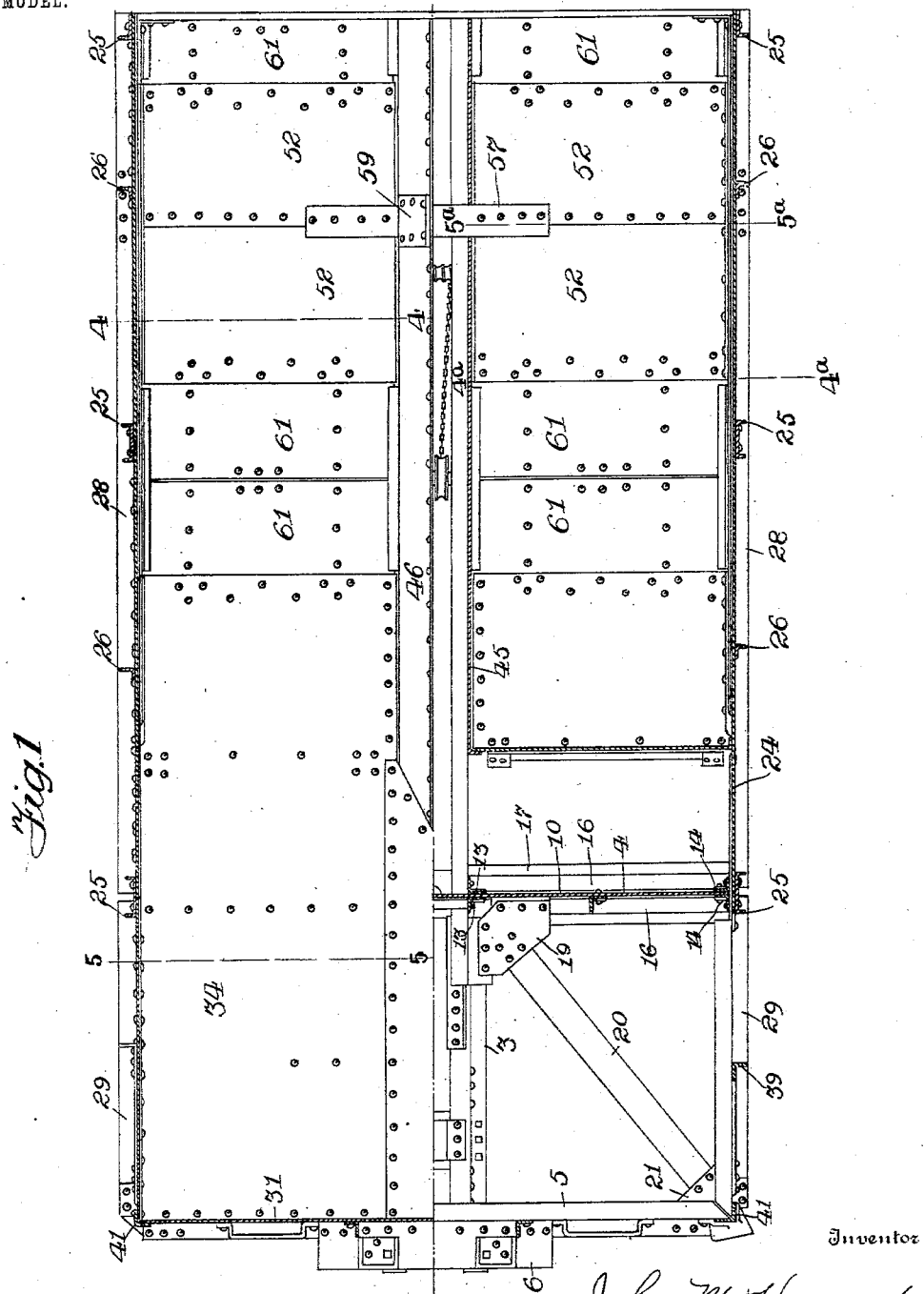
Figure 2:
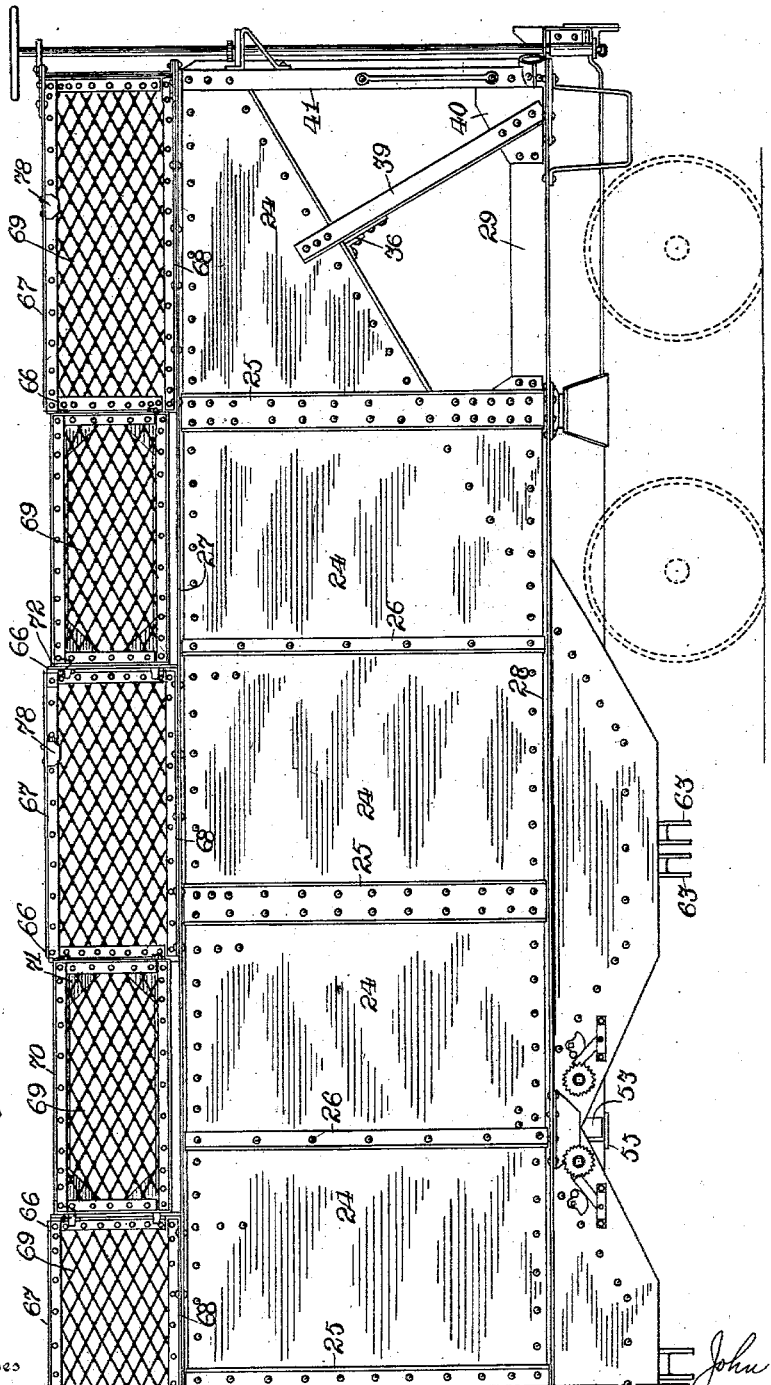
Figure 3:
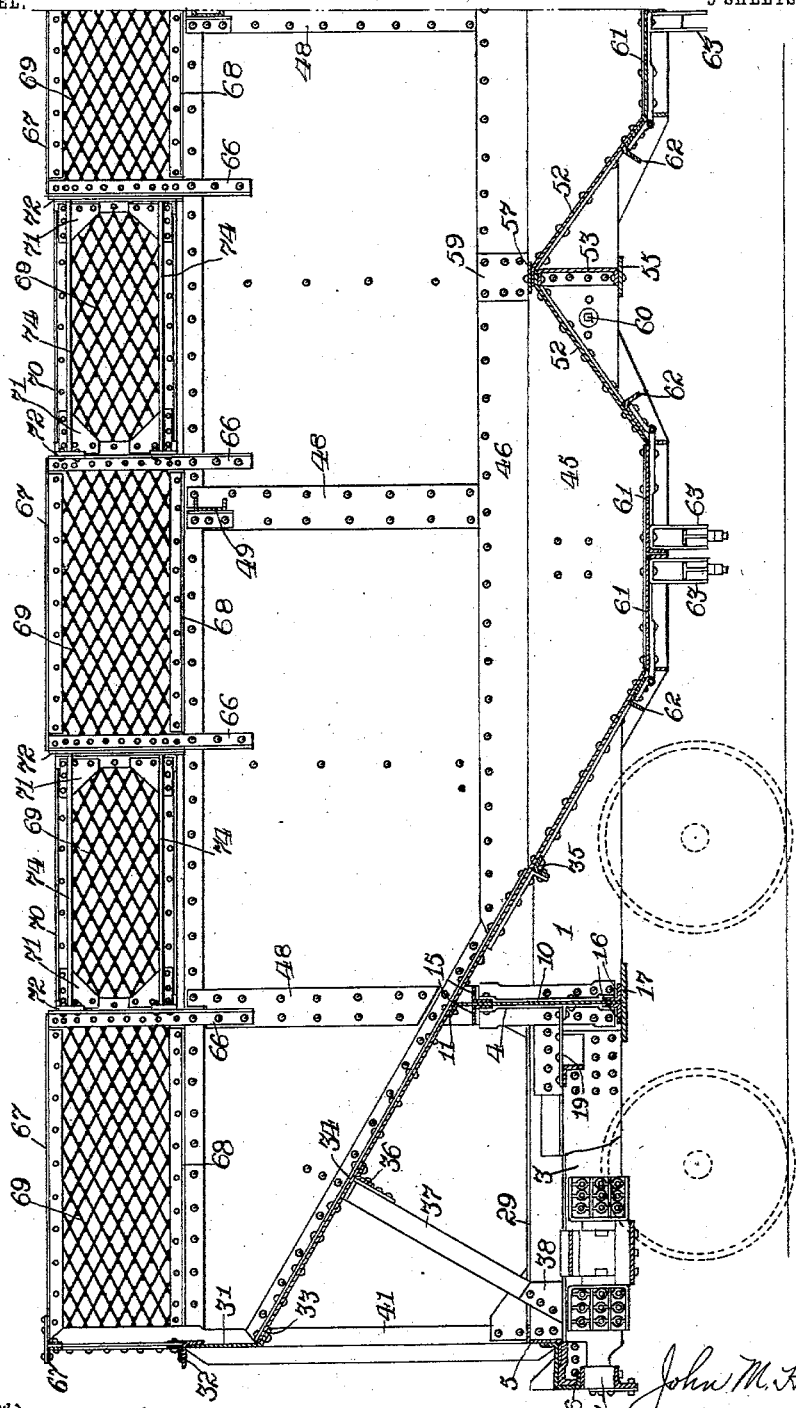
Figure 4:
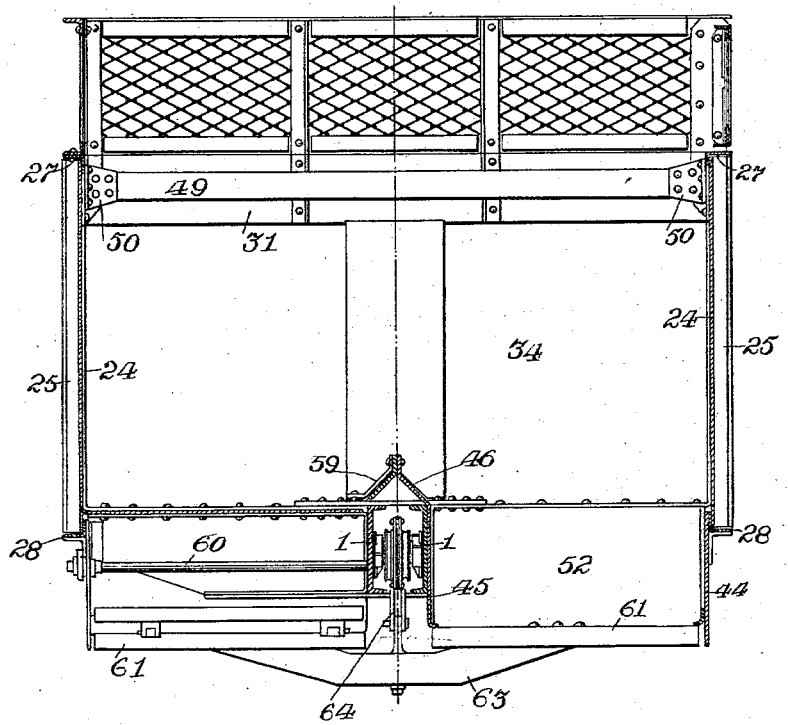
Figure 5:
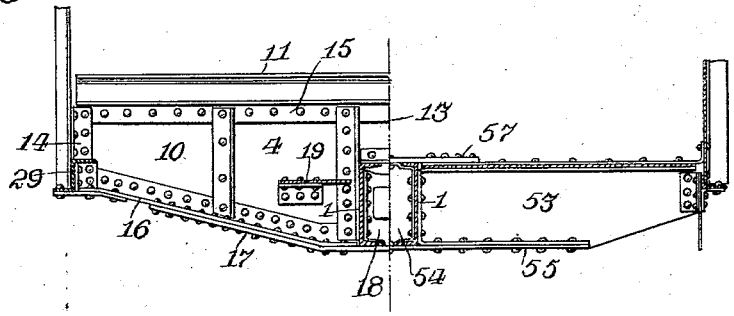

In the accompanying drawings, Figure 1 in its upper portion is a plan view of one-half of the car and in its lower portion a horizontal section thereof exposing the underframing. Fig. 2 is a side view of one-half of the car. Fig. 3 is a vertical central longitudinal section thereof. Fig. 4 on its left-hand portion is a section on the line 4 4, Fig. 1, and on its right-hand portion a section on the line 4ª 4ª, Fig. 1. Fig. 5 on its left-hand portion is a section on the line 5 5, Fig. 1, and on its right-hand portion is a section on the line 5ª 5ª, Fig. 1; and Figs. 6 and 7 are details of the movable coke-rack section.

The underframe of the car includes two center sills 1, which may be of any suitable or desired construction and which are shown as rolled channel-beams placed with their flanges projecting toward each other. The draft-sills 3 preferably are separate from the center sills and riveted thereto outside the body-bolster 4 in order to facilitate repairs. The end sills 5 are shown as Z-bars placed with the web horizontal, their upper flanges projecting inwardly and their lower flanges projecting outwardly. At the center of the end of the car is a pressed metal hood 6, secured to the lower flange of the end sill and serving to support the outer end of the draft-beams 3. This hood is provided with an opening 7 for the passage of the draw-bar shank and has secured thereto the draw-bar carrier 8.

The body-bolster 4 is composed of a web-plate 10, extending from side to side and projecting a considerable distance above the center sills, said plate having its upper edge provided with the inclined flange 11 for supporting the inclined floor-plates. The web-plate 10 is secured to the center sills by means of vertical sections of angle-bar 13 and to the car sides by similar members 14. It is strengthened by means of angle or other flanged members 15, located a considerable distance above the center sills and in proximity to the upper edge of the plates. To the lower edges of the plate 10 are riveted sections of angle-bar 16, extending from the center sills to the car sides, and riveted to these angle-bars is a lower connecting or cover plate 17, extending underneath the center sills and out toward the sides of the car. Between the center sills is the usual center brace 18, and secured to the cover-plate 17 are the usual center plate and side bearings.

Secured to the web-plate of the body-bolster and to the center sills are connecting-plates 19. Secured to these plates are diagonal braces 20, preferably angle-bars, having their outer ends secured to gusset-plates 21, riveted to the corners of the car.

The car shown is not provided with side sills; but the sides of the car are plate-girders and serve to carry the load as well as confine the lading. Said sides are composed of plates 24, which are united by means of the channel or similar stakes 25 and stiffened at intervals by angle or similar stakes 26 and provided with a top chord 27 and a bottom chord 28 of flanged bars, preferably angle-bars. This combination of top and bottom chords, web-plates, and vertical stiffening members forms a true plate-girder extending from bolster to bolster and secured to the bolsters by being riveted to the vertical angle-bars 14. Extending from the bolsters to the corner of the cars are sub side sills 29, which are shown as sections of Z-bar.

The body of the car has its sides formed by the plate-girders just described and its ends by plates 31, stiffened at the top by an angle 32 and having a flange 33 formed on its lower edge to support the inclined floor-plates 34. These inclined floor-plates are supported on the flange 11 of the body-bolster and extend downwardly below the center sills, as shown, and are supported on the center sills by means of a floor-beam 35 and are also supported intermediate the bolster and the car end by a transverse support 36, preferably formed of angle-bar and connected to struts 37, extending thence diagonally downwardly and outwardly and having their ends secured to the draft-beams by means of vertical connection-plates 38. The projecting portion of the body is also supported by diagonal braces 39, secured to the side plates and to vertical connection-plates 40, riveted to the sub side sills at the corners of the car. A further support is formed by the corner-posts 41 and intermediate end posts.

On the inside of the car-body where the side plates 24 meet are strengthening plates or welts 48, and connecting the side walls of the car at intervals are cross-ties 49, formed of flanged bars, channel-bars being shown, secured to the car sides by means of angle-pieces 50.

The hopper extensions are formed by plates 44, riveted to the lower edges of the plate-girder sides and forming the outside hopper-sheets. The inside hopper-sheets are composed of plates 45, secured to the outer faces of the center sills and projecting somewhat below the same. These plates also project above the center sills and have the projecting portions bent inwardly, as at 46, and provided with flanges for riveting them together in order to form the longitudinal ridge of the car.

The construction of the car so far described is largely the same as cars heretofore in use or patented by me, and the special constructions described have been selected for purposes of illustration largely, it being understood that they may be varied without affecting the novel parts of the car now to be described.

The car is provided with a plurality of hoppers in its body, three pairs of such hoppers being shown. The inclined walls of the end hoppers are formed by the lower extensions of the inclined floor-plates 34, while the inclined walls of the inner sides of the end hoppers and of the intermediate hopper are formed by plates 52, which have flanges formed at their upper edges and resting on the top of cross connectors or diaphragms 53, extending from the center sills to the car sides and secured to both. These cross connectors or transoms may be of any desired construction, but preferably will be flanged bars having a vertical web and top and bottom flanges, and, as shown in the drawings, they are pressed scoop-shaped members having integral flanges at one end for riveting to the center sill and being secured to the car sides by knee-pieces. Between the center sills, in line with these diaphragms, are braces 54. A bottom cross-connecting plate 55 is riveted to the lower flange of two opposite diaphragms 54 and extends continuously underneath the center sills. A top cross-connecting plate 57 is riveted to the top flanges of the cross-connecting members 65 and lies on top of the flanges of the inclined hopper-plates 52 and also extends continuously across the center sills. To make room for this top cross-connector, the plates 45, forming the inner hopper-sheets and cross-ridge, are trimmed off at their meeting ends, so as to leave a space 58, and this space is bridged by cover plates or welts 59, extending on each side up to the apex of the longitudinal ridge.

The diaphragms 53 form a strong support for the inclined hopper-plates 52, and in the triangular space formed by said diaphragms and inclined hopper-plates are located the door operating or winding shafts 60. The doors 61 are hinged to butts secured to the lower edges of the inclined hopper-sheets, said lower edges being strengthened by means of angle-bars 62. The doors are arranged transversely of the car and united in pairs, being connected across the car by beams 63. The door-closing means 64 is secured to the beams 63, said means being located between the center sills and may be of any desired construction. The arrangement of the doors is such that they are in horizontal position when closed.

To the top of the car sides and ends is secured an extension-rack which preferably will be formed of alternate stationary and movable sections. The stationary sections are formed by vertical stakes or posts 66, riveted to the car sides on the inner side thereof, which stakes are united at their top by means of horizontal angle-bars 67 and at their bottom by means of similar angle-bars 68. The latter are also riveted to the upper rail or angle-bar 27 of the sides. The frame thus formed is filled in with any light open metallic structure, that shown in the drawings being open mesh 69, known as "expanded" metal.

The movable rack-sections comprise rectangular frames formed of horizontal and vertical angle-bars 70, united at the corners by connection-plates 71 and having the open part filled in by some open light metallic structure, such as the expanded metal 69. These movable rack-sections will be so secured in place that they can be either entirely removed or at least moved out of the way. I prefer the latter construction and have so shown them in the drawings. To this end each of the vertical bars 66 has riveted thereto a pair of outwardly-projecting ears or brackets 72, which are provided with holes. The angle-bars 70 of the movable sections are placed with their flanges projecting inwardly, and extending through holes formed in these inwardly-projecting flanges of the vertical members of the movable rack-sections are a pair of guide-rods 74. These guide-rods pass through the holes formed in the ears 72, connected to one of the vertical posts 66, and at their opposite ends are provided with extensions or heads 75, adapted to pass easily through the openings formed in the ears 72 of the opposite post 66. As a consequence the movable rack-sections, together with the rods 74, can be slid endwise, being guided by these rods in the ears 72 on one of the posts. The extensions or heads 75 serve to hold the end of the movable section in place when in closed position by passing through the openings in the ear 72 and are provided with openings through which may be passed a locking-pin 77.

78 represents downhanging clips or brackets secured to the upper side of the stationary rack-sections and serving to guide the movable sections when the latter are slid back.

The car described will of course be provided with the usual brake-shaft and other appurtenances, but which form no part of the present invention, and therefore are not described.

What I claim as my invention, and desire to secure by Letters Patent, is—

1. In a hopper-bottom car, the combination with a center and side sills, of a diaphragm extending from the center sill to the side sills and secured to both, of inclined hopper-plates provided with flanges at their upper edges resting on and secured to said diaphragm, a cross-connection plate extending over the center sills and also secured to said diaphragm, and doors secured to the lower edges of said inclined plates.

2. In a hopper-bottom car, the combination with a center and side sills, of a diaphragm extending from the center sill to the side sills and secured to both, said diaphragm being provided with a top flange, of inclined hopper-plates provided with flanges at their upper edges and resting on the top flange of said diaphragm and sloping in opposite directions, a cross-connection plate extending over the center sills and overlapping the flanges of the inclined floor-plates and riveted through the same to the top flange of the diaphragm, and doors secured to the lower edges of said inclined plates.

3. In a hopper-bottom car, the combination with center sills and plate-girder sides and side sills, of diaphragms extending from the center sills to the car sides and secured to both, a transverse tie member extending across the center sill and secured to the diaphragm, and a longitudinal ridge over the center sills secured thereto and provided with openings for the passage of the transverse tie member.

4. In a hopper-car, the combination with body-bolsters, center sills and car sides, of diaphragms intermediate the body-bolsters and extending from the center sills to the car sides and secured to both, and being provided with top and bottom flanges, transverse tie members extending respectively above and below the center sills and secured respectively to the top and bottom flanges of said diaphragms, and a longitudinal ridge over the center sills and secured thereto, said ridge lying above the upper transverse tie member.

5. In a hopper-bottom car, the combination with the center sills and car sides, of diaphragms extending from the center sills to the car sides and secured to both, a transverse tie member extending across the center sills and secured to the diaphragms, a longitudinal ridge over the center sills and secured thereto, said ridge being formed in sections and spaced apart to permit of the passage of the transverse tie member, and cover plates or welts uniting the meeting ends of said sections.

6. In a metallic railway-car, the combination with the car sides and ends, of an extension-rack therefor comprising stationary sections of open metallic structure rigidly secured to the car sides, outwardly-projecting brackets on said sections provided with openings, movable sections of open metallic structure, and guide-rods secured to said movable section and passing through the holes in the brackets on the stationary sections.

7. A metallic railway-car comprising side and end walls, an extension-rack therefor comprising stationary sections formed of open metallic structures and rigidly secured to the car sides, brackets provided with openings secured to said stationary sections, movable sections composed of an angle-bar frame having inwardly-projecting flanges, an open metallic structure secured to said frame, guide-rods secured to the inwardly-projecting flanges of the angle-frame and passing through the openings in the brackets secured to the stationary sections and provided with extensions at one end, and means for locking said movable section in place.

8. A metallic railway-car comprising side and end walls, an extension-rack therefor comprising stationary sections rigidly secured to the car sides, outwardly-projecting brackets on said sections provided with openings, movable sections, guide-rods secured to said movable sections and passing through the holes in brackets on one stationary section and having extensions passing through the openings in the opposite stationary section, and a lock applied to said rods.

9. A metallic car comprising side and end walls, an extension-rack therefor comprising stationary sections rigidly secured to the car sides, movable sections, brackets secured to one of said sections and provided with holes in their outer ends, longitudinal guide-rods secured to the other section and passing through the holes in said brackets, and clips secured to the stationary section and provided with vertical portions arranged to engage the movable sections.

10. In a metallic railway-car, the combination with the side and end plates provided with strengthening-angles at their upper edges, said angles having the horizontal flange on top, an extension-rack for the said car comprising vertical angle-bars secured to the car sides, horizontal angle-bars connected to said vertical bars, the lower one of said horizontal bars being riveted to the top rail of the car sides, and metallic open mesh secured to said stakes and horizontal bars.

In testimony whereof I, the said JOHN M. HANSEN, have hereunto set my hand.

JOHN M. HANSEN.

Witnesses:
ROBERT C. TOTTEN,
G. C. RAYMOND.